(12) United States Patent
Gill

(10) Patent No.: US 7,734,986 B2
(45) Date of Patent: Jun. 8, 2010

(54) WRITE MARGIN ADJUSTMENT MECHANISM IN A TAPE DRIVE SYSTEM

(75) Inventor: Richard A. Gill, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1011 days.

(21) Appl. No.: 11/479,753

(22) Filed: Jun. 29, 2006

(65) Prior Publication Data

US 2008/0002268 A1    Jan. 3, 2008

(51) Int. Cl.
*H03M 13/00* (2006.01)
(52) U.S. Cl. ...................................... 714/771
(58) Field of Classification Search .................. 714/746, 714/755, 771, 5; 360/46, 53, 72; 711/111; 369/13.37, 15
See application file for complete search history.

(56) References Cited

U.S. PATENT DOCUMENTS

| 4,953,168 | A  | * | 8/1990 | Odaka .......................... 714/755 |
| 5,255,272 | A  | * | 10/1993 | Gill et al. ..................... 714/765 |
| 6,898,036 | B2 | * | 5/2005 | Gill et al. ....................... 360/53 |
| 6,967,803 | B2 | * | 11/2005 | Nakamura .................. 360/72.1 |

* cited by examiner

*Primary Examiner*—Shelly A Chase
(74) *Attorney, Agent, or Firm*—Dorsey & Whitney LLP

(57) ABSTRACT

A method for dynamically adjusting read margin and write margin in a tape drive system to recover data is disclosed. The method includes the operations of monitoring a write driver to determine if a change in rewrite activity to a medium has changed and adjusting a percentage of error correcting code (ECC) capability to be used for write errors if the rewrite activity has changed. An apparatus including a tape medium and a read/write controller for performing the method is also disclosed. In one embodiment, the percentage of ECC is decreased if the rewrite activity to the medium increases.

20 Claims, 3 Drawing Sheets

WRITE MARGIN ADJUSTMENT MECHANISM IN A TAPE DRIVE SYSTEM

FIELD OF INVENTION

An embodiment of the invention relates to the recording and retrieval of digital information on magnetic tape, and more particularly to methods and procedures for recovering from errors occurring during data transfer operations.

BACKGROUND OF INVENTION

Conventional tape drive data storage systems employ various error correction and recovery methods to detect and correct data errors which, if left unresolved, would compromise the integrity of information read from or written to the magnetic tape media. For example, magnetic recording systems have inherent noises that cause recording bit errors to occur. These noises include such things as poor recording signal, media defects, electronic system noise, and other conditions that interfere with head/media data transfer operations.

Error correction and recovery may be thought of as two distinct operations that are employed at different stages of error processing. Error correction is conventionally implemented using error correction coding (ECC) techniques in which random host data to be placed on a tape medium is encoded in a well-defined structure by introducing data-dependent redundancy information. The presence of data errors is detected when the encoded structure is disturbed. The errors are corrected by making minimal alternations to reestablish the structure. ECC error correction is usually implemented "on-the-fly" as data is processed by the tape drive apparatus. The well-known Reed-Solomon code is one cyclic encoding scheme which has been proposed for ECC error correction. Other encoding schemes are also known in the art.

The capability of the ECC is fixed for any given recording system. For instance, a portion of the ECC capability is devoted to errors received while recording the data. This component is referred to as "Write Margin". The remainder of the capability is budgeted for reading data at a later time when additional error may occur due to minor tape damage or aging. The amount of ECC left for reading is called "Read Margin".

The greater the read margin the more reliable a tape drive system is for retrieving the customer's data. As read margin is increased, write margin is decreased causing an increase in write errors that resort to timely error recovery or permanent write errors. A recording system should provide sufficient write margin to maintain performance across a mix of media and hardware. Accordingly, the read and write margin limits are set at a fixed level. The fixed limit may generate tapes that have few errors having close to limit margin and not utilizing additional space on tape reserved for error recovery.

Therefore, it is desirable to utilize additional space on a magnetic tape to increase read margin.

SUMMARY OF INVENTION

The present invention includes novel methods and apparatus for recovering data in a tape drive system. According to one embodiment of the invention, a method is disclosed. The method includes monitoring a write driver to determine if a change in rewrite activity to a medium has changed and adjusting a percentage of error correcting code (ECC) capability to be used for write errors if the rewrite activity has changed According to another embodiment of the invention, an apparatus is disclosed. The apparatus includes a tape medium and a read/write controller. The read/write controller includes a write driver to control the writing of data to the tape medium, and a data protect component to monitor the write driver to determine if a change in rewrite activity to the tape medium has changed. In addition, the data protect component decreases a percentage of error correcting code (ECC) capability to be used for write errors if the rewrite activity has increased.

DESCRIPTION OF THE DRAWINGS

The invention may be best understood by referring to the following description and accompanying drawings that are used to illustrate embodiments of the invention. In the drawings.

DETAILED DESCRIPTION

A method for dynamically adjusting read margin and write margin in a tape drive system is disclosed. In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Figure 1:
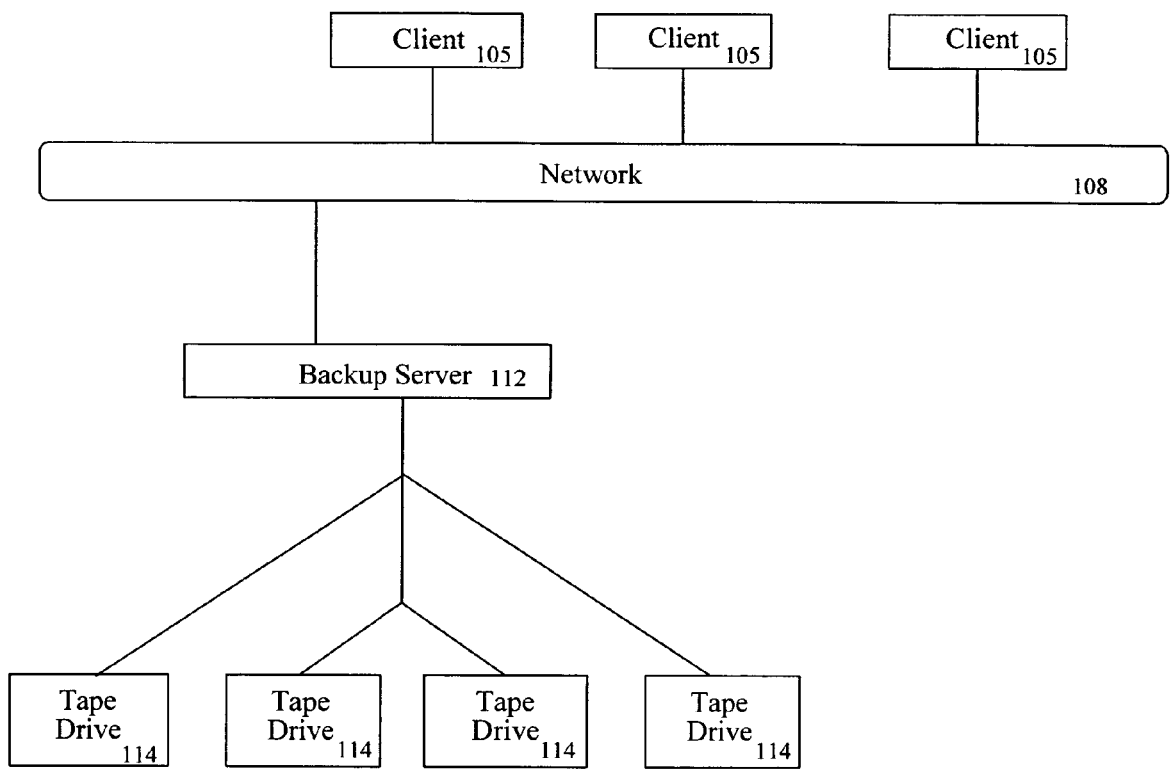
FIG. 1 illustrates one embodiment of a storage network.

FIG. 1 illustrates one embodiment of a storage network 100 in which certain embodiments of the present invention may be implemented. Storage network includes client computers 105. In one embodiment, client computers 105 are personal computers that interface with network 108. The network interface provides communication capability with other clients 105 and a backup server 112 on network 108, or to other computers across the Internet.

In various embodiments, the network interface may be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the client computers 105 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments, that clients 105 are general purpose computers capable of running any number of applications such as those available from companies including Oracle, Siebel, Unisys, Microsoft, and the like.

Figure 2:
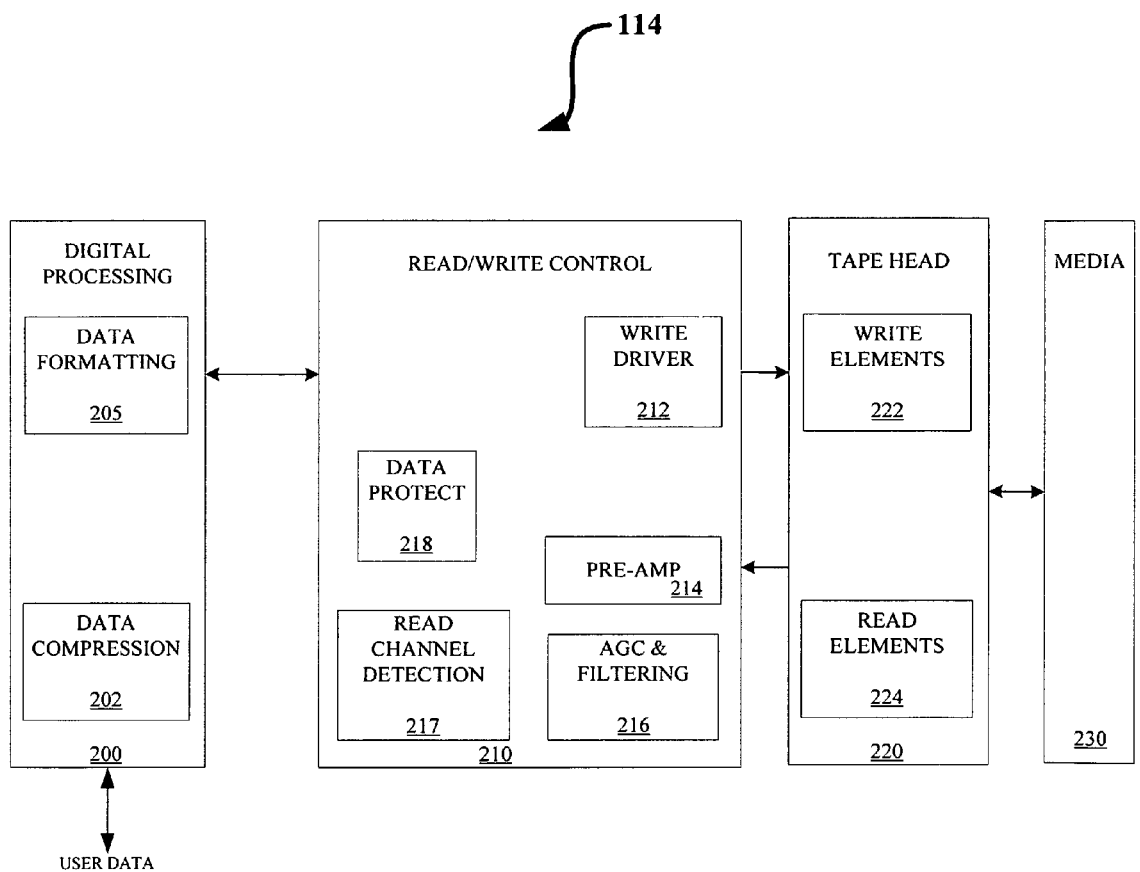
FIG. 2 is a block diagram illustrating one embodiment of a tape drive system.

Backup server 112 is coupled to network 108 and is capable of responding to requests from clients 105 via network 108. In one embodiment, clients 105 "serve" data, such as images or other multi-media objects that they capture or create to server 112. In a further embodiment, server 112 stores the data to one or more tape drives 114 for storage. FIG. 2 illustrates one embodiment of a tape drive 114. Tape drive 114 includes a digital processing unit 200, read/write control 210, tape head 220 and media 230.

Referring to FIG. 2, digital processing unit 200 receives user write data from clients 105 via server 112 that is forwarded for storage, and transmits received read data that is forwarded to clients 105 via server 112. Particularly, digital processing unit 200 includes a data compression unit 202 and data formatting unit 205. Data compression unit 202 compresses write data to be stored at tape drive 114, and decompresses read data to be forwarded to a user. Data formatting unit conditions write data that is to be stored at tape drive 114.

Media 230 is the physical tape medium on which data is stored. In one embodiment, media 230 is a magnetic tape. Tape head 220 is an electromagnetic component which reads and writes onto media 230 as media 230 passes over it. Tape head 220 includes write elements 222 and read elements 224 to perform the write and read operations.

Read/write control 210 controls the reading and writing of data at tape drive 114. Read/write control 210 includes a write driver 212, pre-amplifier 214, automatic gain and control (AGC) and filtering unit 216, read channel detection 217 and data protect 218. Write driver 212 is implemented to control the writing of user data to media 230.

According to one embodiment, write driver 212 implements Progressive Write Technology, developed by Storage Technology of Louisville, Colo., to provide read-back reliability. In such an embodiment, write driver skips down media 230 if it encounters difficulty in writing to media 230. As a result, write driver remaps the data farther down the tape rather than attempting to re-write on the same spot. Note that in other embodiments, write driver 212 may implement other types of re-writing schemes.

Pre-amplifier 214 provides low noise amplification of a read signal received from read elements 224. AGC and filtering unit 216 includes an AGC component that is implemented to adjust for variations in signal amplitude and to keep a fixed input signal to read channel detection. A filtering component of unit 216 is used to shape waveforms for better detection and forwards to a read channel detection 217.

Data protect 218 uses ECC to protect user data. In one embodiment, data protect 218 performs Reed Solomon (RS) encoding by adding bytes of data to user bytes to enable recovery of user data bytes when some bytes are missing due to defects or damage to media 230. Data protect 218 also provides data interleave and rotation which distributes user data and RS bytes over a larger piece of media 230. According to a further embodiment, data protect 218 writes to media 230 16 channels at a time to allow data to be distributed across the width of media 230.

According to one embodiment, RS encoding is performed by taking 52 user data bytes are at a time, with data protect 218 providing an additional 12 unique bytes to the 52 to form a special group of 64 bytes. The 64 byte group is referred to as a codeword. A codeword, when read from media 230, has the following properties: if up to any 12 bytes are missing the remaining bytes are used to recreate all 64 bytes, including the 52 bytes of customer data. If more than 12 bytes are missing, there is an attempt to re-read the data and possibly attempts to change certain parameters that may enable the data block to be recoverable.

As discussed above, conventional tape drive systems establishes ECC capabilities for read errors and write errors at a fixed level by establishing a percentage (e.g., 80%) of ECC to be used for read margin, with the remainder (20%) being used for write margin. According to one embodiment, data protect 218 dynamically adjusts the percentage read/write margins.

In such an embodiment, data protect 218 minimizes write margin and maximizes read margin based upon rewrite activity occurring at write driver 212. Thus, data protect 218 monitors the progressive write activity performed at write driver 212 and adjusts the percentage read/write margins accordingly.

In one embodiment, as rewrite activity increases the write margin is lowered to acceptable re-writes. For example, if the initial read margin and write margin are established at 80% and 20%, respectively, and data protect 218 detects that write driver 212 is rewriting an increasing amount of data, data protect 218 may increase the read margin to 85%, while decreasing the write margin to 15%. The write margin may be decreased since the likely of writing errors decrease with the data being remapped to a different area of media 230.

In a further, embodiment, if after the write margin has been decreased, data protect 218 may increase the write margin upon detecting a decrease in rewrite activity at write driver 212. For instance, if the initial read margin and write margin are data protect 218 detects that write driver 212 is rewriting an increasing amount of data, data protect 218 may increase the write margin from 15% back to 20% upon detecting the decrease in rewrite activity.

Figure 3:
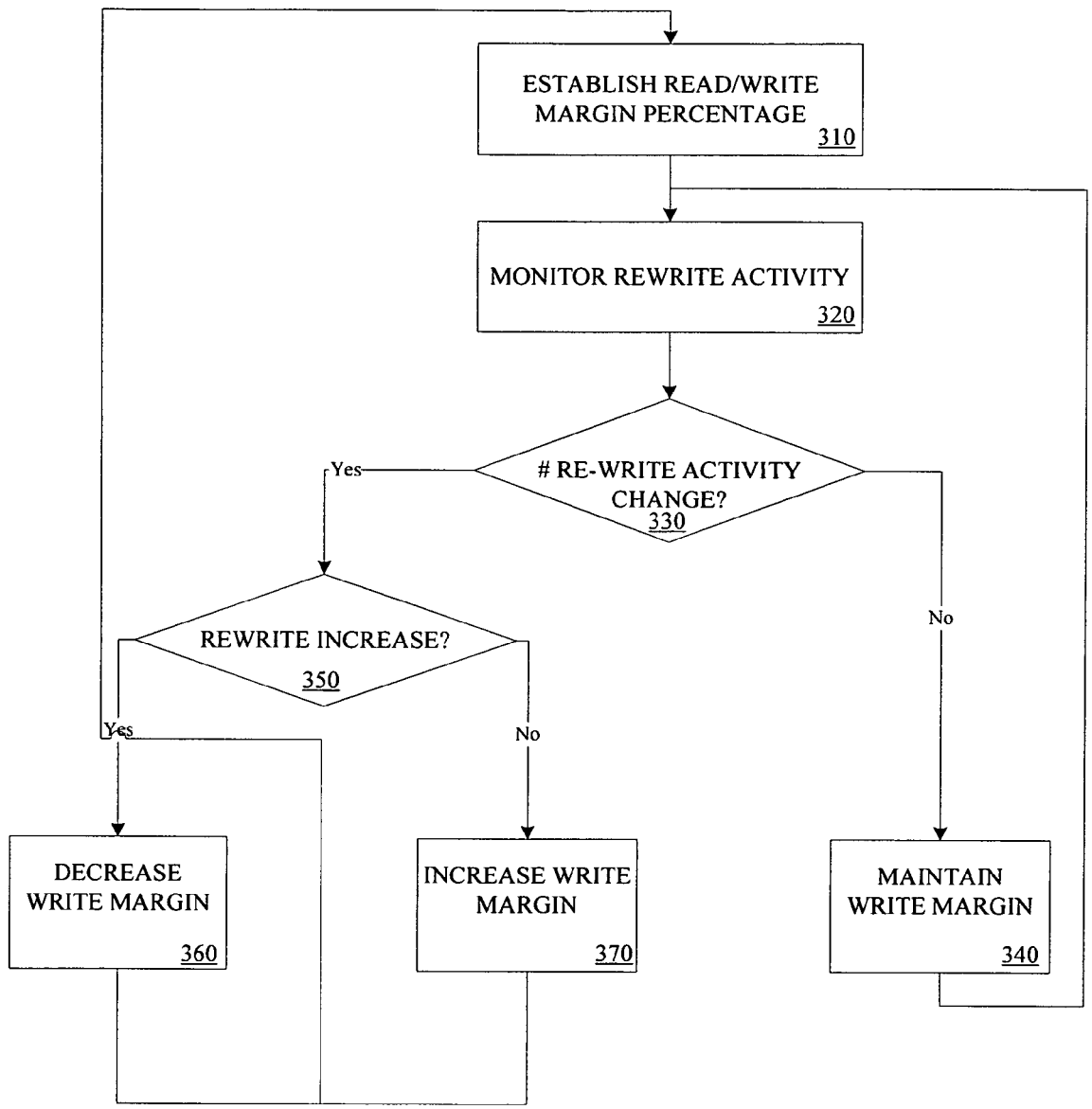
FIG. 3 is a flow diagram illustrating a method according to one embodiment.

FIG. 3 is a flow diagram illustrating one embodiment of the operation of data protect 218. At processing block 310 the initial capability percentages of ECC to be used for read margin and write margin are established. At processing block 320, data protect 218 monitors rewrite activity at write driver 212. At decision block 330, it is determined whether the rewrite activity at write driver 212 has changed.

If there has been no change in rewrite activity at write driver 212 the write margin is maintained, processing block 340. Subsequently, control is returned to processing block 320 where the rewrite activity at write driver 212 is monitored. If a change in re-write activity has occurred, it is determined whether the change is attributable to a rewrite increase, decision block 350.

If the rewrite activity has been determined to have increased, the write margin is decreased, processing block 360. Control is then returned to processing block 310 where updated capability percentages of ECC to be used for read margin and write margin are established. If the rewrite activity has been determined to have decreased, the write margin is increased, processing block 370. Control is again returned to processing block 310 where updated capability percentages of ECC to be used for read margin and write margin are established.

The above-described mechanism is closed loop system that enables the ECC write margin to decrease whenever rewrite activity decreases. As a result, tapes are created that are virtually pristine (e.g., close to the full capability of the ECC is available for data retrieval). Such a system can return a quality factor for customer requiring high reliability standards.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
   monitoring a write driver of a tape drive system to determine if a change in rewrite activity to a tape medium has changed; and
   utilizing a read/write controller of the tape drive system to adjust a percentage of error correcting code (ECC) capability to be used for write errors if the rewrite activity has changed.

2. The method of claim 1 comprising decreasing the percentage of ECC capability to be used for write errors if the rewrite activity has increased.

3. The method of claim 1 further comprising increasing the percentage of ECC capability to be used for write errors if the rewrite activity has decreased.

4. The method of claim 1 further comprising maintaining the percentage of ECC capability to be used for write errors if the rewrite activity remains unchanged.

5. The method of claim 1 further comprising establishing an initial percentage of ECC capability prior to monitoring the write driver.

6. The method of claim 1 wherein the rewrite activity is performed by the write driver remapping data farther down the medium from an initial attempt to write if the write driver encounters difficulty in writing to the medium.

7. An apparatus, comprising:
   a tape medium; and
   a read/write controller having:
      a write driver to control the writing of data to the tape medium; and
      a data protect component to monitor the write driver to determine if a change in rewrite activity to the tape medium has changed; and to decrease a percentage of error correcting code (ECC) capability to be used for write errors if the rewrite activity has increased.

8. The apparatus of claim 7 wherein the data protect component increases the percentage of ECC capability to be used for write errors if the rewrite activity has decreased.

9. The apparatus of claim 7 wherein the data protect component maintains the percentage of ECC capability to be used for write errors if the rewrite activity remains unchanged.

10. The apparatus of claim 7 wherein the data protect component establishes an initial percentage of ECC capability prior to monitoring the write driver.

11. The apparatus of claim 7 wherein the write driver performs the rewrite activity by remapping data farther down the tape medium from an initial attempt to write if the write driver encounters difficulty in writing to the medium.

12. The apparatus of claim 7 further comprising a read/write head comprising write elements to write the data to the tape medium.

13. The apparatus of claim 12 wherein the read/write controller further comprises:
   a pre-amplifier to provide low noise amplification of a read signal received from the read/write head; and
   automatic gain control to adjust for variations in signal amplitude.

14. The apparatus of claim 13 further comprising a processing unit to format the data bytes once ECC is performed.

15. An article of manufacture, comprising a machine-accessible medium including data that, when accessed by a machine, cause the machine to perform operations comprising:
   monitoring a write driver of a tape drive system to determine if a change in rewrite activity to a tape medium has changed; and
   utilizing a read/write controller of the tape drive system to adjust a percentage of error correcting code (ECC) capability to be used for write errors if the rewrite activity has changed.

16. The article of manufacture of claim 15 wherein when accessed by a machine, further causes the machine to perform operations comprising decreasing the percentage of FCC capability to be used for write errors if the rewrite activity has increased.

17. The article of manufacture of claim 15 wherein when accessed by a machine, further causes the machine to perform operations comprising increasing the percentage of ECC capability to be used for write errors if the rewrite activity has decreased.

18. The article of manufacture of claim 15 wherein when accessed by a machine, further causes the machine to perform operations comprising maintaining the percentage of ECC capability to be used for write errors if the rewrite activity remains unchanged.

19. The article of manufacture of claim 15 wherein when accessed by a machine, further causes the machine to perform operations comprising establishing an initial percentage of ECC capability prior to monitoring the write driver.

20. The article of manufacture of claim 15 wherein the rewrite activity is performed by the write driver remapping data farther down the medium from an initial attempt to write if the write driver encounters difficulty in writing to the medium.

* * * * *

UNITED STATES PATENT AND TRADEMARK OFFICE
CERTIFICATE OF CORRECTION

| | |
|---|---|
| PATENT NO. | : 7,734,986 B2 |
| APPLICATION NO. | : 11/479753 |
| DATED | : June 8, 2010 |
| INVENTOR(S) | : Richard A. Gill |

It is certified that error appears in the above-identified patent and that said Letters Patent is hereby corrected as shown below:

In column 6, line 55, in claim 16, delete "FCC" and insert -- ECC --, therefor.

Signed and Sealed this
Second Day of August, 2011

David J. Kappos
*Director of the United States Patent and Trademark Office*